United States Patent
Sahlem

(10) Patent No.: US 7,938,430 B1
(45) Date of Patent: May 10, 2011

(54) ANTI-SWAY DEVICE FOR TRAILERS

(76) Inventor: Donald Peter Sahlem, Akron, NY (US)

( * ) Notice: Subject to any disclaimer, the term of this patent is extended or adjusted under 35 U.S.C. 154(b) by 407 days.

(21) Appl. No.: 11/298,877

(22) Filed: Dec. 9, 2005

Related U.S. Application Data

(60) Provisional application No. 60/636,125, filed on Dec. 15, 2004, provisional application No. 60/680,802, filed on May 14, 2005.

(51) Int. Cl.
*B60D 1/173* (2006.01)
(52) U.S. Cl. ............... 280/455.1; 280/456.1; 280/490.1
(58) Field of Classification Search ............... 280/455.1, 280/457, 460.1, 467, 474, 478.1, 483, 484, 280/490.1, 468, 412
See application file for complete search history.

(56) References Cited

U.S. PATENT DOCUMENTS

| | | | |
|---|---|---|---|
| 4,019,754 A | 4/1977 | Hinckley | |
| 4,664,402 A * | 5/1987 | Kober et al. | 280/455.1 |
| 4,722,542 A | 2/1988 | Hensley | |
| 5,660,409 A | 8/1997 | Hensley | |
| 5,934,698 A * | 8/1999 | Despain | 280/490.1 |
| 6,722,682 B2 * | 4/2004 | Valliere et al. | 280/405.1 |
| 6,851,696 B1 | 2/2005 | Hensley | |

* cited by examiner

*Primary Examiner* — Anne Marie M Boehler

(57) ABSTRACT

An anti-sway device for conventional trailers, which essentially takes the place of the shank member of a conventional trailer hitch, is described. The shank assembly is comprised of an elongate square member coupled to a conventional hitch receiver of a tow vehicle. Attached to the rearward end of the square member is a pivot member with rearward diverging links connecting it to another somewhat wider pivot member to which a conventional ball mount is attached. The ball mount is further linked to the towed trailer such that the tongue of the trailer is fixed to the ball mount about a vertical axis. This arrangement results in the trailer pivoting about the resulting center of rotation of the converging links, which is substantially forward of the ball of the trailer hitch. Moving the pivot point forward, such as that found on a fifth wheel trailer, reduces sway and enhances the stability of the coupled trailer and tow vehicle.

10 Claims, 10 Drawing Sheets

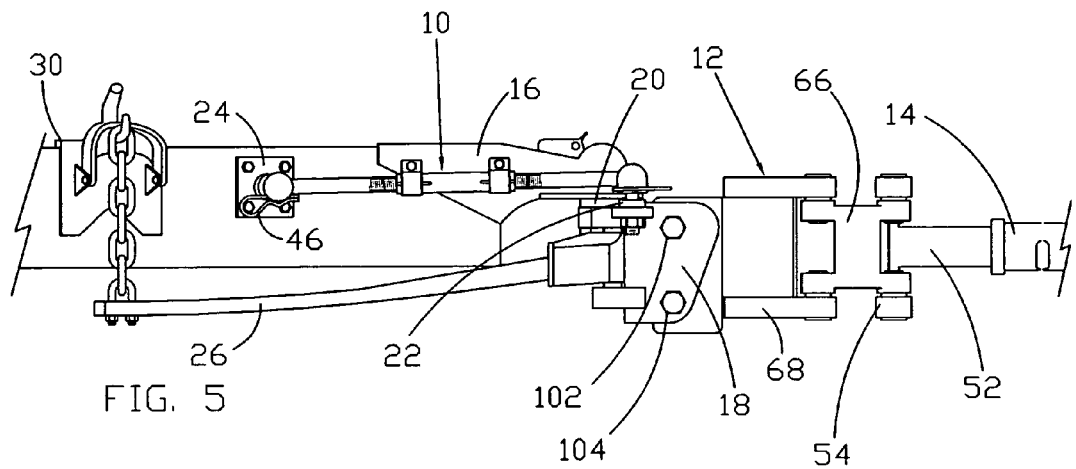
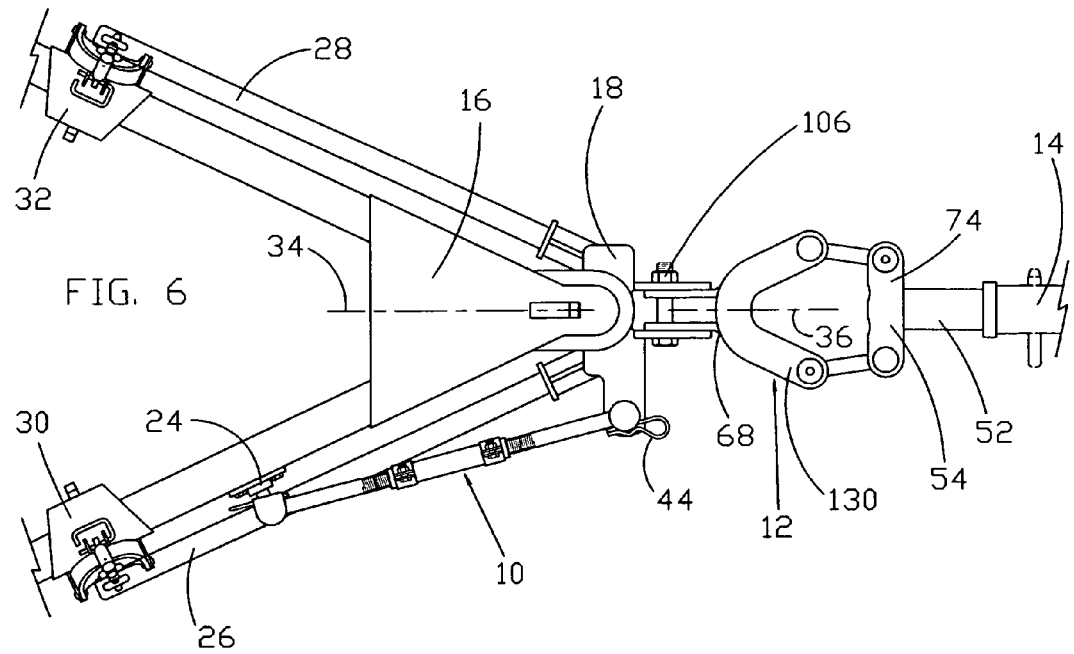

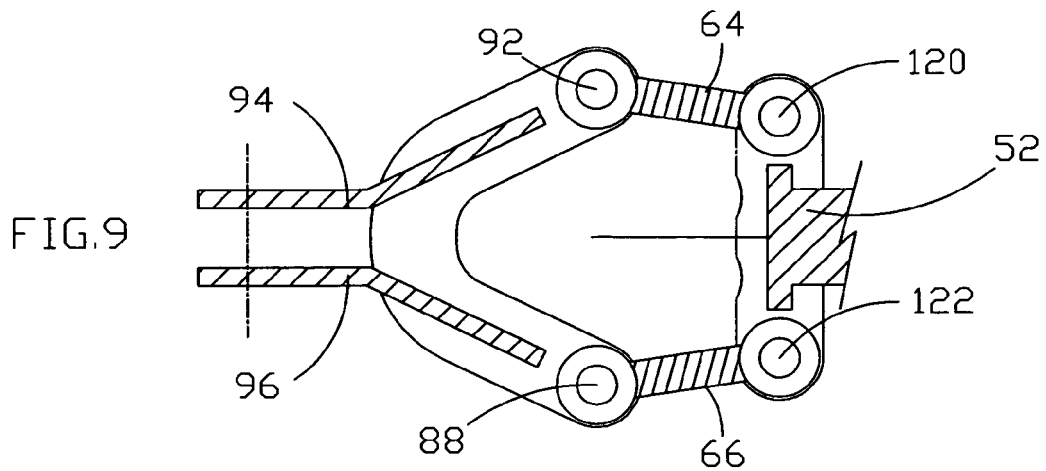
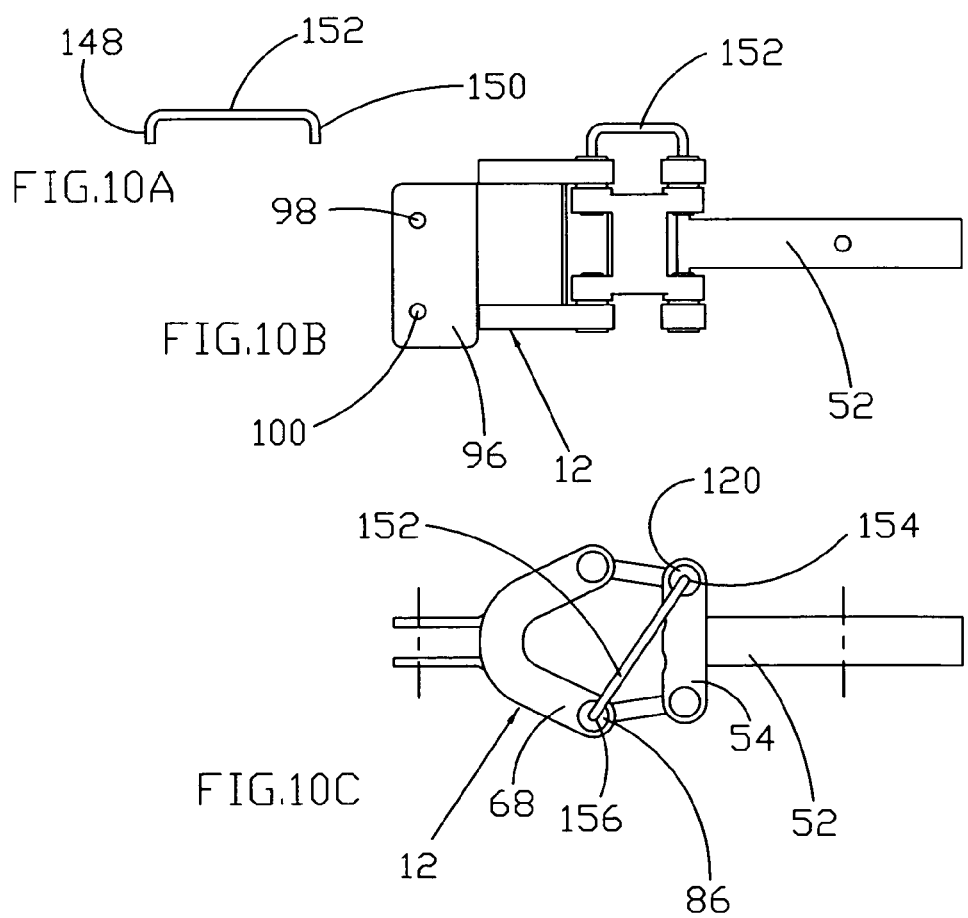

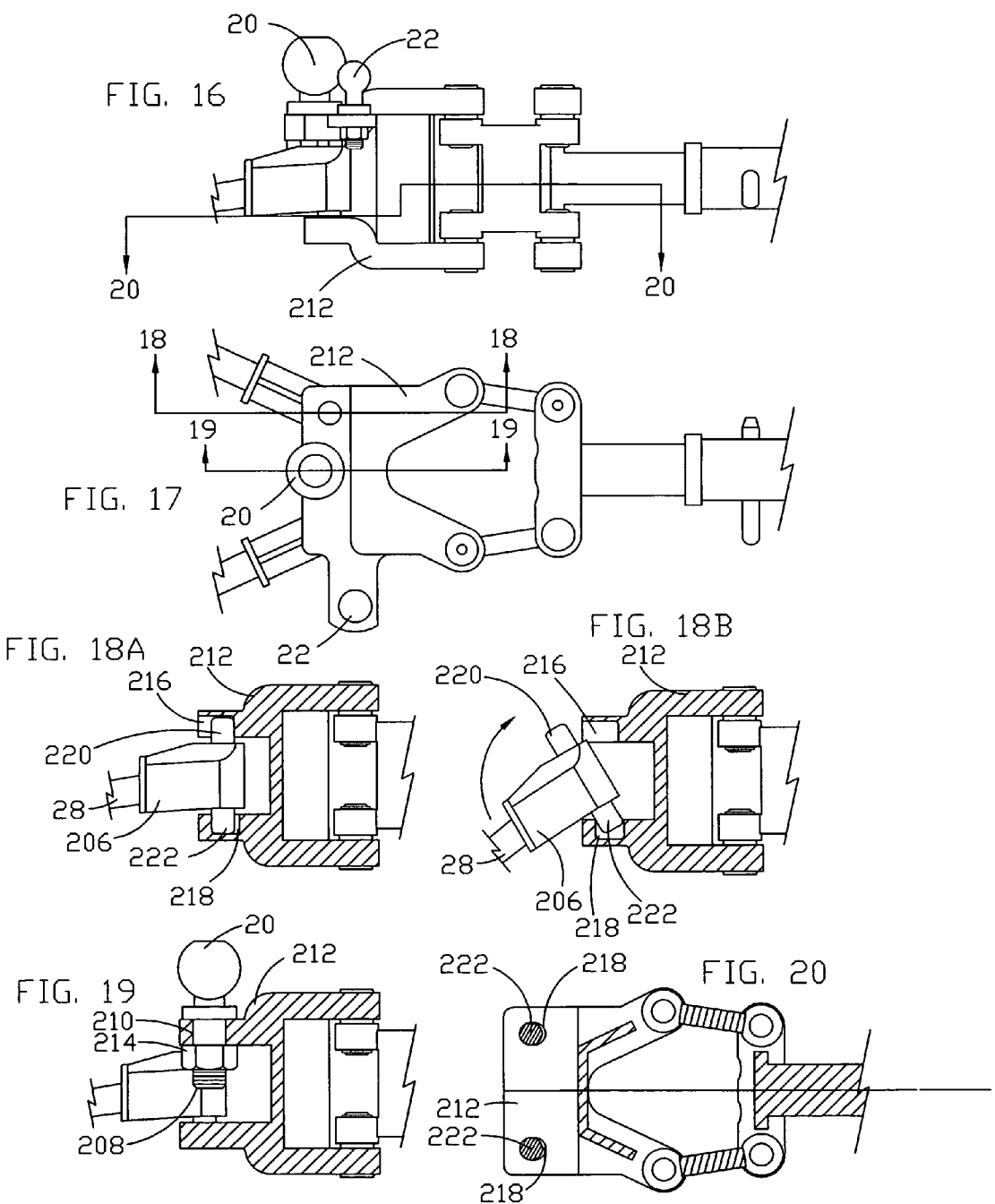

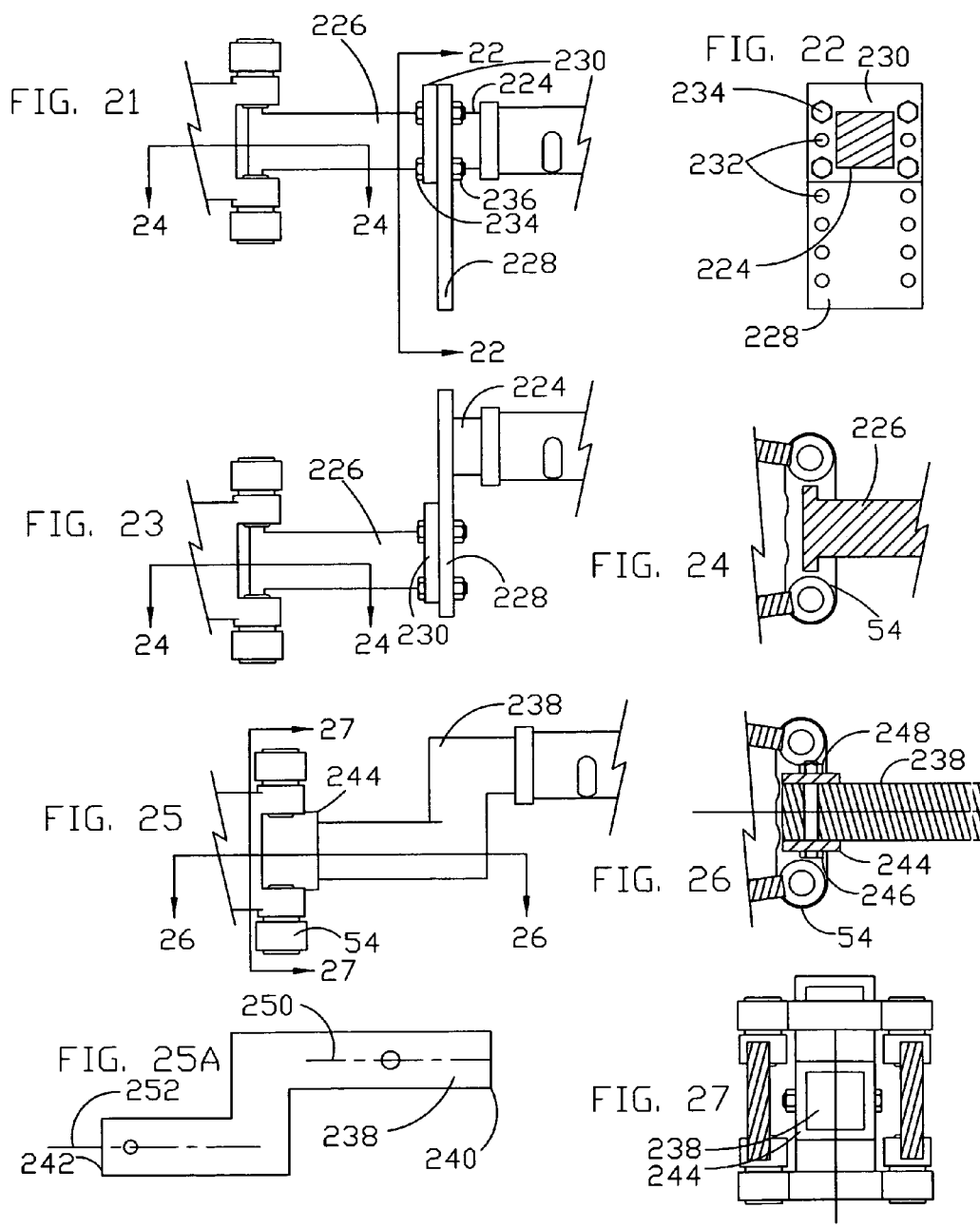

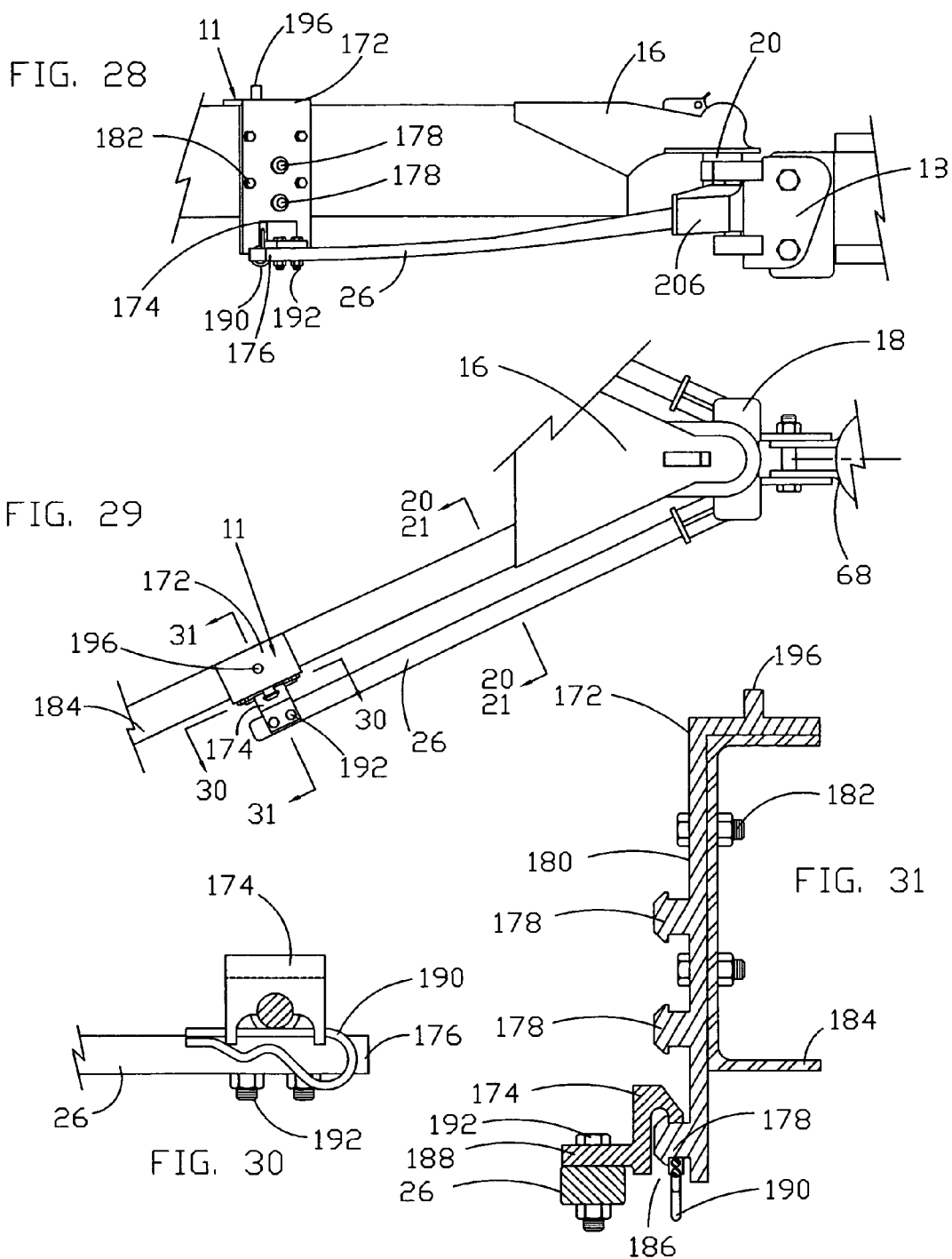

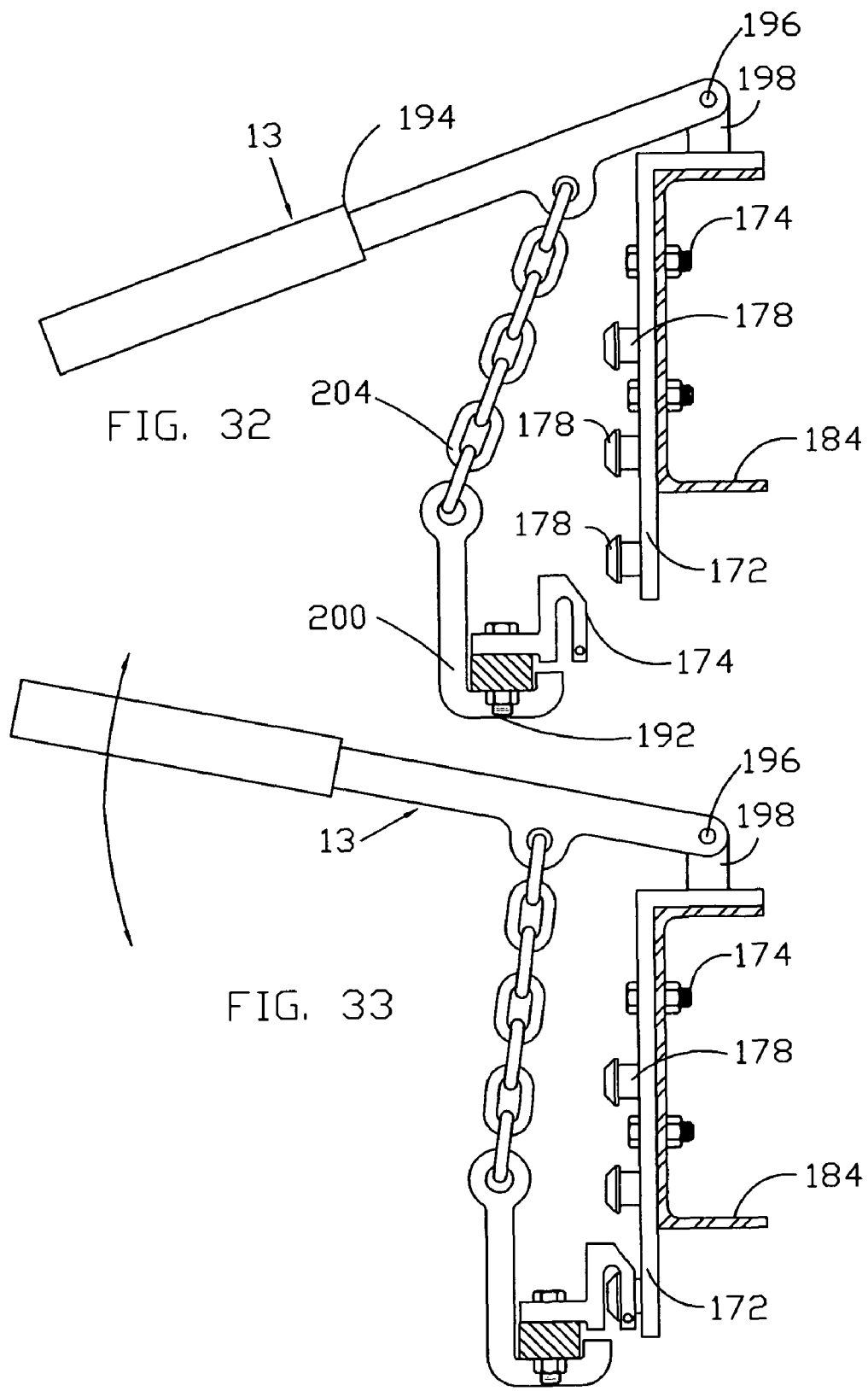

ANTI-SWAY DEVICE FOR TRAILERS

CROSS-REFERENCE TO RELATED APPLICATIONS

This application claims the benefit of PPA 60/636,125 dated Dec. 15, 2004 and PPA 60/680,802 dated May 14, 2005.

BACKGROUND OF THE INVENTION

1. Field of Invention

The present invention relates to anti-sway devices for conventional trailers. Conventional trailers are coupled at the extreme rear of the tow vehicle. Lateral forces encountered by the trailer due to wind, road conditions or uneven loading are transmitted to the tow vehicle through the hitch. The distance between the ball connection of the trailer and the rear axle of the tow vehicle determines by how much leverage the trailer applies these lateral forces to the tow vehicle. Longer distances between the ball connection and the rear axle result in less stability of the trailer and tow vehicle combination. In the case of fifth wheel trailers, where the pivot point is directly over the rear axle of the tow vehicle, the lateral forces are minimized and the coupled trailer and tow vehicle is stable. Effectively moving the pivot point of a conventional trailer and tow vehicle combination closer to the rear axle of the tow vehicle, thereby reducing sway and improving stability, is achieved by this invention by utilizing a four link mechanism as described herein.

2. Prior Art

Previously, shifting the pivot point of a towed trailer forward was accomplished as described in U.S. Pat. Nos. 4,019,754 4,722,542, 5,660,409, and 6,851,696. The device described in U.S. Pat. No. 4,019,754 solved the sway problem, but would not accommodate sharp turns. The device described in U.S. Pat. No. 4,722,542 solved the sway problem and allowed for sharp turns, but required a specialized structure and was not readily adaptable to the conventional components of an equalizing trailer hitch. It also had tongue weight limitations due to the vertical height of the converging links. The device described in U.S. Pat. No. 6,851,696 uses a similar structure as U.S. Pat. No. 4,772,542 with additional strut assemblies for transferring weight off of the converging links. The device described in U.S. Pat. No. 5,660,409 used a similar structure as U.S. Pat. No. 4,722,542 applied to a special braking system.

3. Objects and Advantages

The objects and advantages of the present invention are:
(a) To provide an anti-sway device that shifts the pivot point of a towed trailer forward thereby increasing stability.
(b) To provide an anti-sway device that is readily adaptable to standard equalizing hitch components.
(c) To provide an anti-sway device that allows height adjustment to level the trailer and tow vehicle when hitched.
(d) To provide an anti-sway device that can be inverted about its horizontal centerline, providing additional height adjustment.
(e) To provide an anti-sway device that during the hitching process, allows lateral movement of the hitch ball, thereby speeding up the hitching process.
(f) To provide an anti-sway device that can accommodate larger tongue weight loads without additional support means.

Further objects and advantages of my invention will become apparent from a consideration of the drawings and the ensuing description.

SUMMARY OF THE INVENTION

The present invention is directed to an effective anti-sway device that is easily installed and, in one embodiment, is adaptable to standard equalizing hitch components.

BRIEF DESCRIPTION OF THE DRAWINGS

FIG. 5 is a side view of both assemblies of the anti-sway device, shown installed.

FIG. 6 is a top view of both assemblies of the anti-sway device, shown installed.

FIG. 9 is a sectional view of first and second pivot members, connecting links and associated pins.

FIG. 10 shows top and side views of the anti-sway device, with a tool used for initial setup.

FIG. 16 is a side view of an alternate embodiment of the anti-sway hitch bar assembly.

FIG. 17 is a top view of an alternate embodiment of the anti-sway hitch bar assembly.

FIG. 18 is a sectional view of an alternate embodiment of the anti-sway hitch bar assembly.

FIG. 19 is a second sectional view of an alternate embodiment of the anti-sway hitch bar assembly.

FIG. 20 is a third sectional view of an alternate embodiment of the anti-sway hitch bar assembly.

FIG. 21 is a side view of the anti-sway hitch bar assembly, shown in an alternate embodiment that allows for height adjustment between the tow vehicle and trailer.

FIG. 22 is a sectional view of the anti-sway hitch bar assembly, shown in an alternate embodiment that allows for height adjustment between the tow vehicle and trailer.

FIG. 23 is a side view of the anti-sway hitch bar assembly, shown in an alternate embodiment that allows for height adjustment between the tow vehicle and trailer.

FIG. 24 is a sectional view of the anti-sway hitch bar assembly, shown in an alternate embodiment that allows for height adjustment between the tow vehicle and trailer.

FIG. 25 is a side view of the anti-sway hitch bar assembly, shown in an alternate embodiment that allows for height adjustment between the tow vehicle and trailer.

FIG. 26 is a sectional view of the anti-sway hitch bar assembly, shown in an alternate embodiment that allows for height adjustment between the tow vehicle and trailer.

FIG. 27 is a sectional view of the anti-sway hitch bar assembly, shown in an alternate embodiment that allows for height adjustment between the tow vehicle and trailer.

FIG. 28 is a side view of an alternate embodiment of the adjustable link assembly of the anti-sway device.

FIG. 29 is a top view of an alternate embodiment of the adjustable link assembly of the anti-sway device.

FIG. 30 is a transverse sectional view of an alternate embodiment of the adjustable link assembly of the anti-sway device.

FIG. 31 is a longitudinal sectional view of an alternate embodiment of the adjustable link assembly of the anti-sway device.

FIG. 32 is a first end view of an alternate embodiment of the adjustable link assembly including engaging tool.

FIG. 33 is a second end view of an alternate embodiment of the adjustable link assembly including engaging tool.

DETAILED DESCRIPTION

Figure 1:
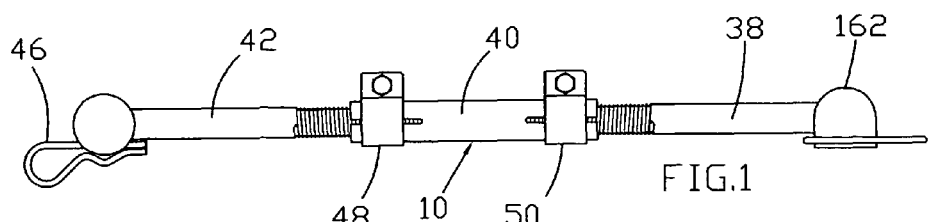
FIG. 1 is a side view of the adjustable link assembly of the anti-sway device.
Figure 2:
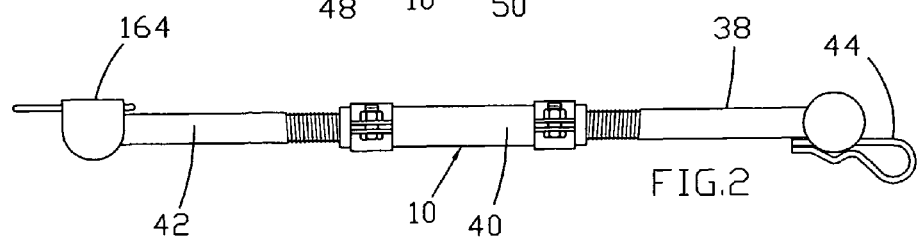
FIG. 2 is a top view of the adjustable link assembly of the anti-sway device.

This invention relates to conventional weight distributing trailer hitches that have friction type sway controls. In its preferred embodiment, the invention consists of two assemblies which are; an adjustable link assembly 10, and an anti-sway hitch bar assembly 12. These assemblies install in place of the friction type sway control and hitch bar elements of a conventional weight distributing hitch. The hitch created by this combination of the two assemblies of the invention and conventional equalizing hitch components, shifts the pivot point of the trailer/tow vehicle combination forward, thereby reducing sway. FIGS. 1 through 4 show side and top views of the adjustable link assembly 10 and anti-sway hitch bar assembly 12. FIGS. 5 and 6 show side and top views of the invention as installed to the hitch receiver of a tow vehicle 14, and a conventional trailer tongue 16. The other standard parts of this hitch are; a standard ball mount 18 with a hitch ball 20 and a sway control mounting ball 22, a separate rear sway control mounting ball 24 attached to the tongue of the trailer 16, spring bars 26 and 28, and snap-up brackets 30 and 32.

The first of two assemblies of the invention is the adjustable link 10. This assembly performs two functions. The first function of the adjustable link is to connect the sway control mounting ball 22 of the ball mount 18 to a rear sway control mounting ball 24, thereby eliminating rotational movement between the ball mount 18 and the tongue of the trailer 16. The second function of the adjustable link is to be adjustable in length so as to allow for alignment of the longitudinal centerline of the trailer 34 parallel to the longitudinal centerline 36 of the second pivot member 68 of the hitch bar assembly 12 (see FIG. 6). The adjustable link 10 consists of a front section 38, a center section 40, and a back section 42. Both ends of the adjustable link have sockets 162 and 164 that snugly fit over the respective mounting balls 22 and 24 and are retained in place by clips 44 and 46. The back end 42 of the adjustable link 10 is threaded into the center section 40 using right handed threads and locked in position by a clamp 48. The front end 38 of the adjustable link 10 is threaded into the center section 40 using left handed threads and locked in position by a clamp 50. The length of the adjustable link 10 is varied by loosening the clamps 48 and 50, rotating the center section 40 relative to the ends 38 and 42 to achieve the desired length and re-tightening clamps 48 and 50.

Figure 7:
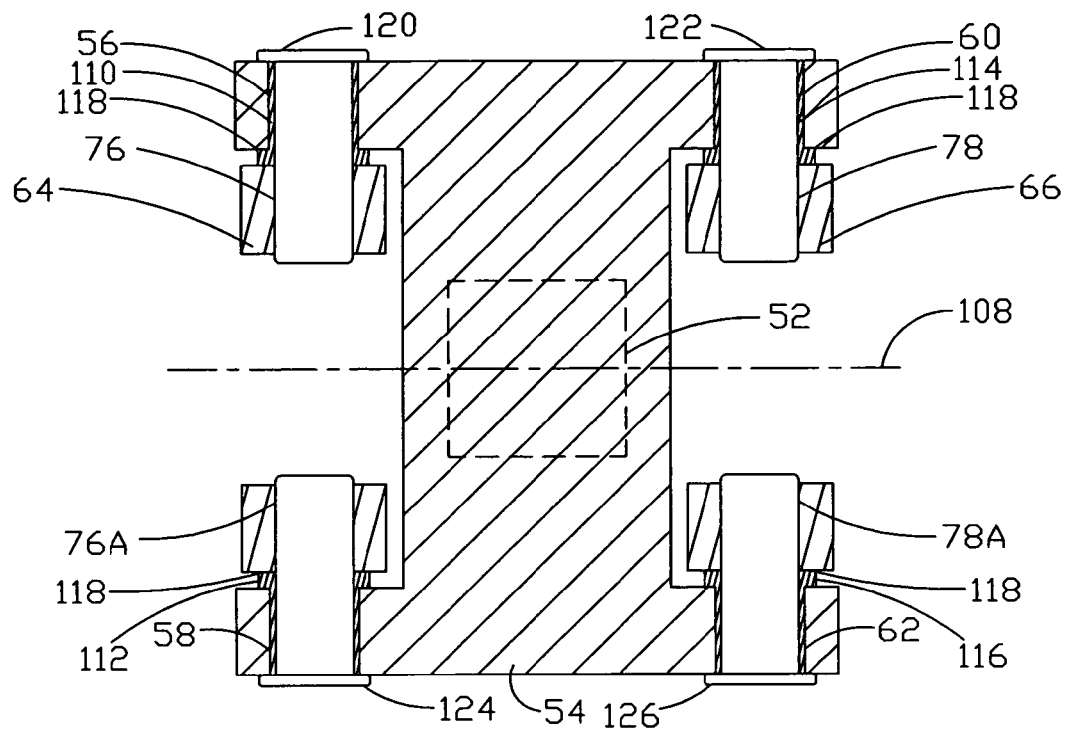
FIG. 7 is a sectional view of the first pivot member and associated links, pins and bearings.

The second of two assemblies of the invention is the anti-sway hitch bar 12. The function of this assembly is, by the geometry of its linkage, in conjunction with the elimination of rotation between the ball mount 18 and the trailer tongue 16, to shift the pivot point of the hitched trailer forward, closer to the rear axle of the tow vehicle. Starting at the front end (FIGS. 3 and 4), the anti-sway hitch bar 12 consists of a square shank section 52 integral with a first pivot member 54. The longitudinal axis of the shank 52 is perpendicular to the longitudinal axis of the rigidly connected first pivot member 54. As shown in FIG. 7, the first pivot member 54 is of a generally symmetrical H-shape with vertically oriented pairs of bearing bores 56, 58, and 60, 62 at the left and right corners. Bearing bores 56 and 58 are coaxial, as are bearing bores 60 and 62. The centerlines of the bearing bore pairs are parallel to each other and are perpendicular to and equally spaced from the horizontal centerline 108 of the shank 52. FIG. 7 also shows first pivot member bearings 110, 112, 114 and 116 inserted in the bearing bores with the shoulders 118 of the bearings facing toward the horizontal centerline 108 of the first pivot member 54. Left and right pairs of pivot pins 120, 122, 124 and 126 are inserted through the respective left and right pairs of bearings 110, 112 and 114, 116 and press fitted into the frontward bored surfaces 76, 76A, 78 and 78A of the two connecting links 64 and 66 (FIGS. 3 and 4), which are pivotally connected to the first pivot member 54. The links are equal in length and the distance between the front bores 76 and 78 and back bores 132 and 136 (see FIG. 8) are longer than one half the distance between the bores 56 and 60 of the first pivot member 54.

Figure 8:
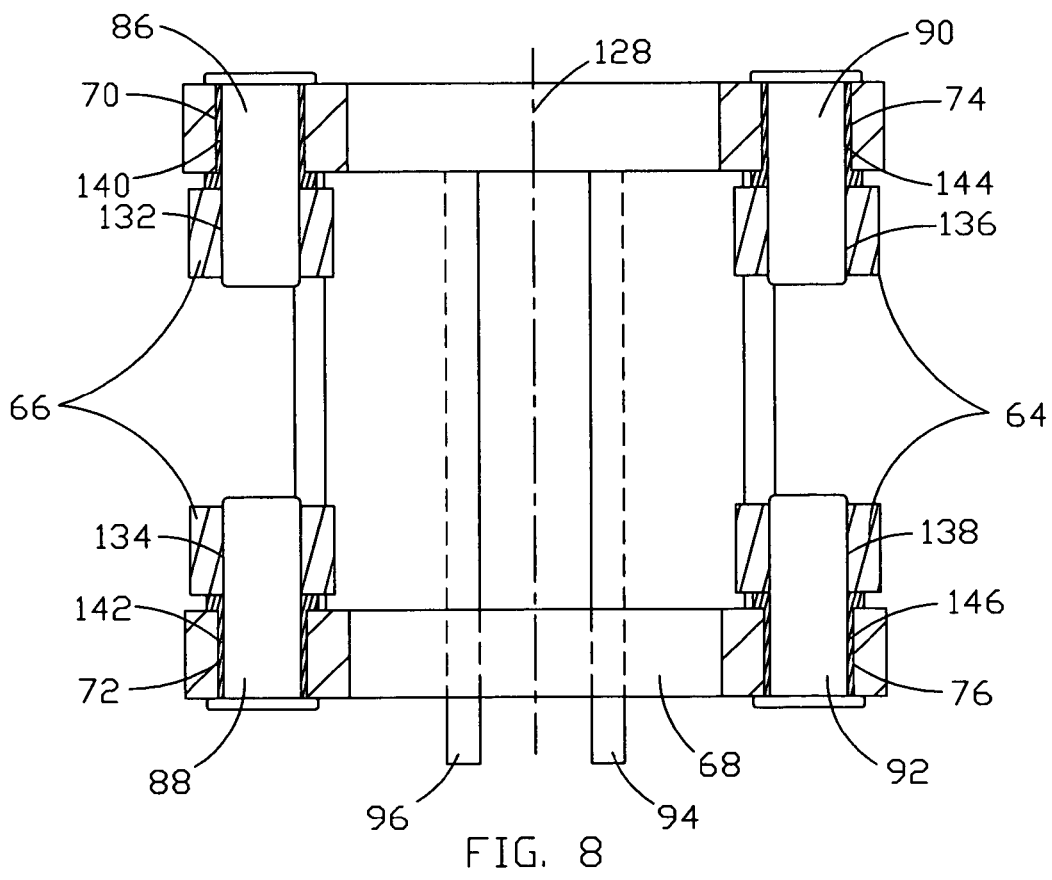
FIG. 8 is a sectional view of the second pivot member and associated links, pins and bearings.

Pivotally connected to the back ends of the connecting links 64, 66 is the second pivot member 68, which lies in the same plane as the first pivot member 54. FIG. 8 is a sectional view of the second pivot member 68 which is V-shaped (FIG. 4) and symmetrical about its vertical centerline 128. The rearward end of the connecting left and right links 64 and 66 are connected to the respective left and right front ends 130A and 130B of the V-shaped pivot member 68, using left and right pairs of pivot pins 86, 88 and 90, 92 which are secured to the connecting links by press fitting in to rearward bored surfaces 132, 134, 136 and 138. The pivot pins are inserted through respective bearings 140, 142, 144, and 146 received in the bearing bores 70, 72, 74, and 76 of the V-shaped pivot member 68. The right pair of bearing bores of the V-shaped pivot member 70 and 72 are coaxial as are the left pair of bearing bores 74 and 76. The centerlines of the bearing bores 70 and 74 are parallel to each other and are equally spaced on opposite sides of the centerline 128 of the V-shaped pivot member 68. The distance between the bores 70 and 74 of the second, V-shaped pivot member 68 is longer than the distance between the bores 56 and 60 of the first, H-shaped pivot member 54.

The vertical distance between the upper and lower pivot bores of the first and second pivot members 54 and 68 (FIG. 3) along with the vertical height of the connecting links 64 and 66 form four parallel couple joints for carrying the axial and bending loads of the hitched trailer.

Figure 3:
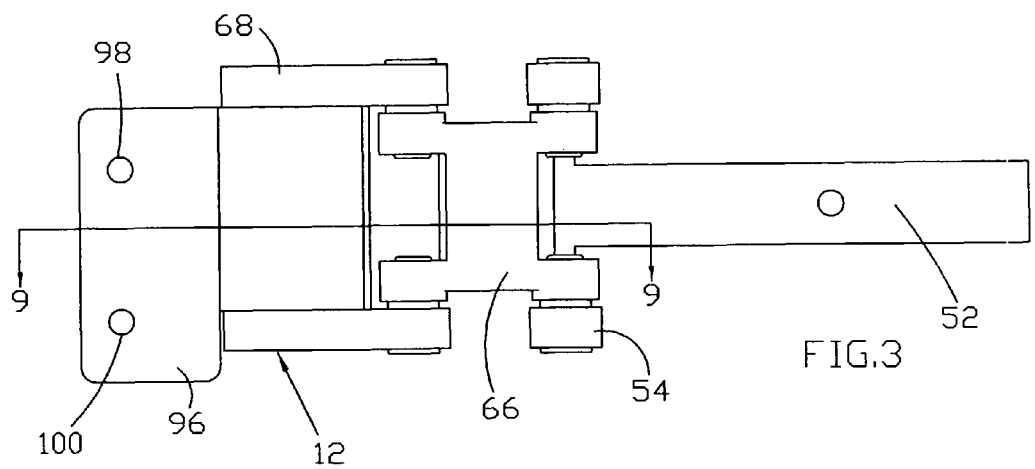
FIG. 3 is a side view of the anti-sway hitch bar assembly of the anti-sway device.
Figure 4:
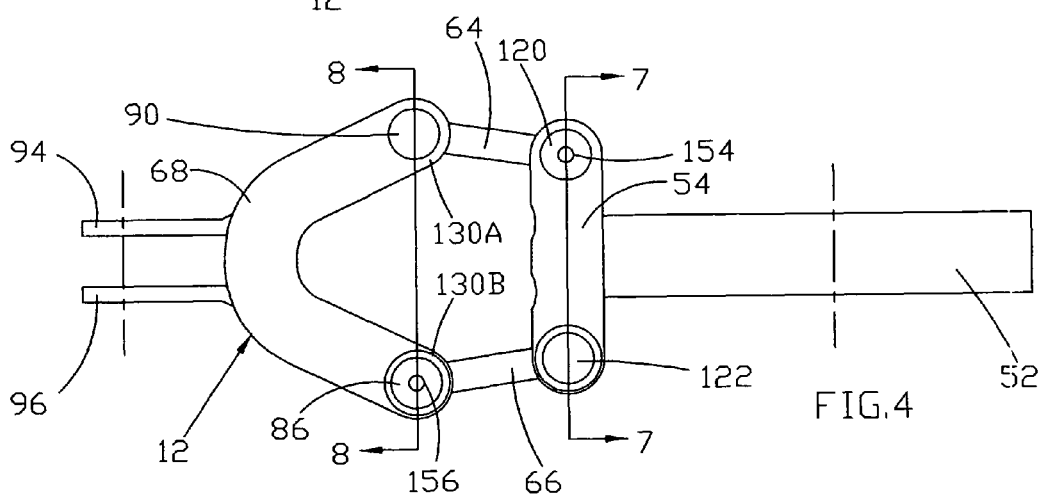
FIG. 4 is a top view of the anti-sway hitch bar assembly of the anti-sway device.

As shown in FIGS. 3 and 4, integral to the V-shaped pivot member 68 are two rearward flanges 94 and 96 which each have vertically oriented mounting holes 98 and 100 for bolting a conventional ball mount 18. The bolts 102 and 104 are secured with nuts 106.

Figure 11:
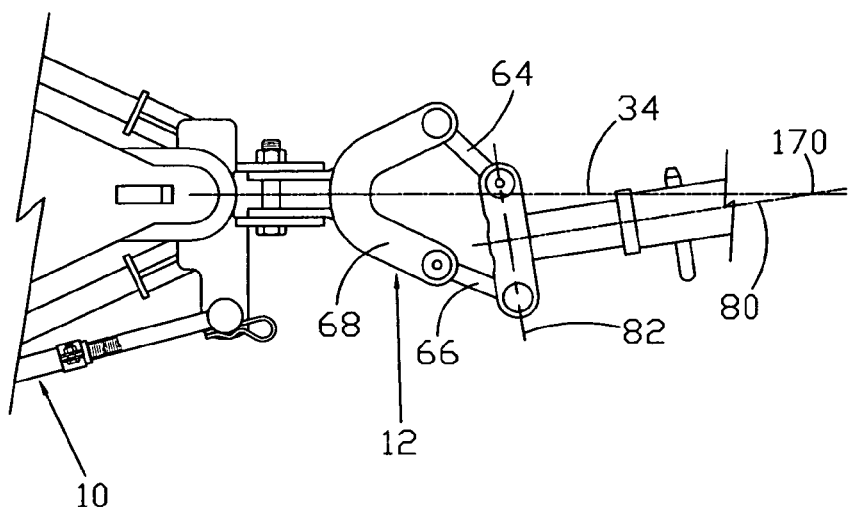
FIG. 11 is a top view of the anti-sway device, shown at the beginning of a turn of the tow vehicle and trailer.
Figure 12:
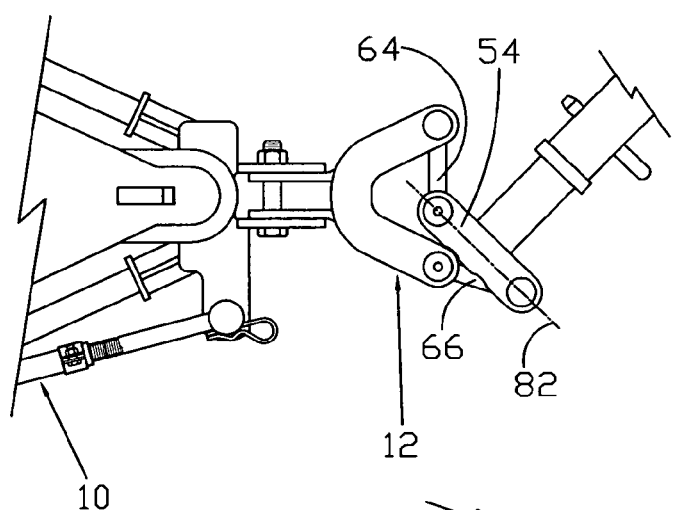
FIG. 12 is a top view of the anti-sway device, shown in a partial turn of the tow vehicle and trailer
Figure 13:
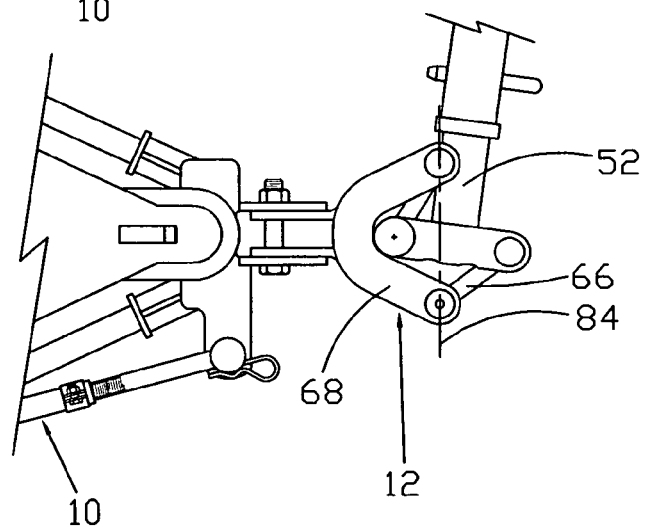
FIG. 13 is a top view of the anti-sway device, shown in a full turn of the tow vehicle and trailer.

When the trailer/tow vehicle is beginning a turn, the effective pivot point of the hitch is shifted forward to the intersection of the centerline of the trailer 34 and the centerline of the tow vehicle 80. This is indicated by point 170 on FIG. 11. As the turn sharpens (see FIGS. 12 and 13), one side of the front pivot member, the left side in this case, rotates into a position where one set of the first pivot member pivot pins, 120, 124 in this case, passes in between the sets of left and right pivot pins 90, 92 and 86, 88 of the rear V-shaped pivot member. At the same time, the second V-shaped pivot member 68 allows clearance for the first pivot member to rotate into a sharp turn. Also, the vertical distance between short pivot pins 86 and 88 and 90 and 92 allow for clearance of the back ends of the connecting links 64 and 66 to partially clear the shank 52 resulting in further turning capability, as shown in FIG. 13. The articulation of the linkage is reversed as the tow vehicle and trailer return to a straight orientation.

Initial setup of the trailer/tow vehicle combination is accomplished as shown in FIG. 10. The H-shaped and V-shaped pivot members 54 and 68 are held in a centered position by temporarily installing the tips 148 and 150 of locating pin 152 into setup holes 154 and 156 of pins 120 and 86. The trailer is then coupled at the hitch ball 20, and the tow vehicle is moved forward enough to let the trailer track straight behind it. The length of the adjustable link 10 is adjusted, as previously described, until it can be placed over the mounting balls 24 and 22. The adjustable link is then locked in position by tightening clamps 48 and 50 and retained on the mounting balls 22 and 24 by installing clips 44 and 46. The locating pin 152 is then removed and the installation is complete. The next time the trailer is hitched, it is first connected to the hitch ball 20. The connecting links can then be rotated using a wrench until the distance between the front and back sway control balls 22 and 24 allows placement of the adjustable link over them. The hitching process is completed by installing clips 44 and 46.

Normally, when hitching with a conventional hitch, the position of the trailer tongue must be directly over the hitch ball. An additional benefit of the invention is that when positioning the tow vehicle relative to the trailer for hitching, the side to side alignment can be off by a couple of inches. The final alignment can be done by rotating the connecting links 64 and 66 thereby moving the hitch ball 20 directly under the trailer tongue 16. The trailer is then hitched and the adjustable link 10 is installed as previously described.

Figure 14:
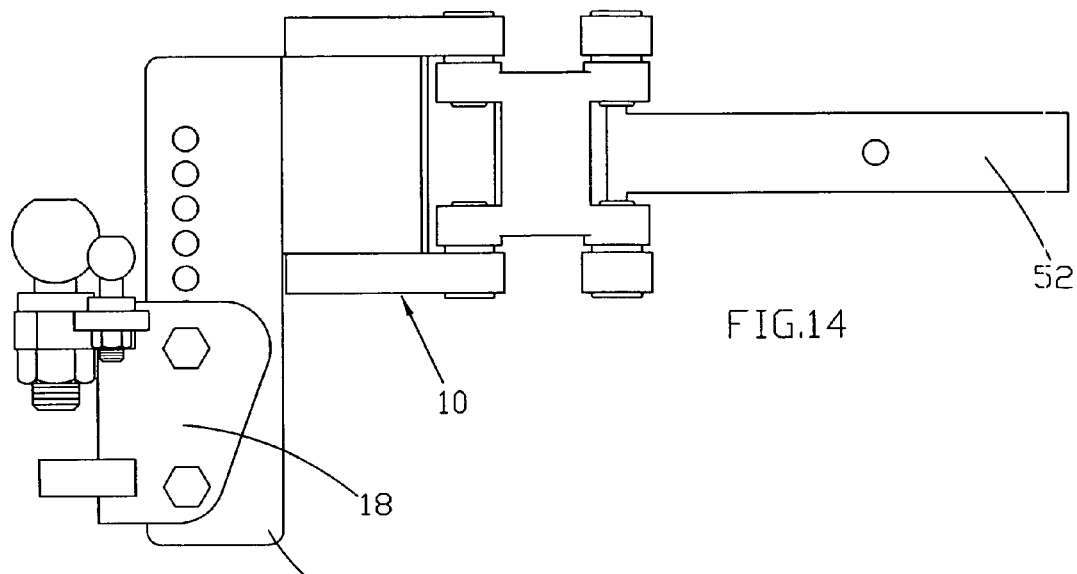
FIG. 14 is a side view of the anti-sway hitch bar assembly, shown in an alternate embodiment that allows for height adjustment between the tow vehicle and trailer.
Figure 15:
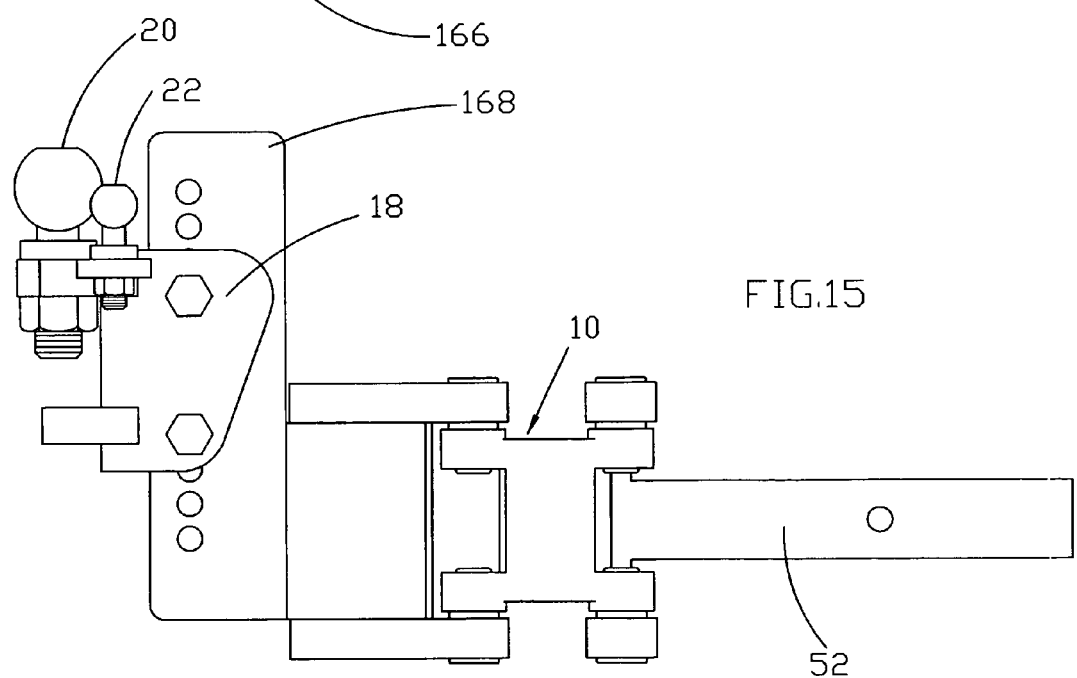
FIG. 15 is a side view of the anti-sway hitch bar assembly, shown inverted in an alternate embodiment that allows for height adjustment between the tow vehicle and trailer.

In a first alternate form of the anti-sway hitch bar assembly, shown in FIG. 14, the bolting flanges 166 and 168 are extended with a plurality of bolt holes to allow for adjustment of the height of the ball mount 18 to the height of the shank 52. FIG. 15 shows the anti-sway hitch bar inverted, allowing for further height adjustment in the opposite direction.

A second alternate form of the anti-sway hitch bar is shown in FIGS. 16 through 20. In this embodiment, the second pivot member and the ball mount (shown as 68 and 18 of FIG. 6) are made as one piece (shown as 212 of FIGS. 16 and 17), thereby eliminating the flanges 94, 96 and bolts 102, 104 (shown in FIGS. 3, 4, 5 and 6). As shown in FIG. 19, the hitch ball 20 is attached by inserting the threaded portion 208 through a hole 210 in the upper portion of the second pivot member 212 and held in place by a nut 214. The second pivot member 212 also has sockets 216 and 218 for attaching the spring bars 26 and 28. FIGS. 18A and 18B show the upper sockets 216 and lower sockets 218 which engage with the upper pin 220 and lower pin 222 of the trunnion 206 portion of the spring bars 26 and 28. When assembling the spring bars into the second pivot member 212, the spring bar is tilted as shown in FIG. 18B. The lower pin 222 is inserted into the lower socket 218, and then rotated thereby sliding the upper pin 220 into the open ended upper socket 216. The opposite end of the spring bar is then attached, and the tension in the spring bar maintains the position shown in FIG. 18A.

In this form of the anti-sway hitch bar, the height adjustment of the hitch ball, as shown in FIGS. 14 and 15 can be alternately accomplished in two different ways.

The first way is shown in FIGS. 21 through 24. In this embodiment, the shank section is split into a forward shank section 224 and a rearward shank section 226. The forward section 224 is rigidly attached to a forward flange 228. The rearward section 226 is rigidly attached to a rearward flange 230, and rigidly attached to the first pivot member is 54 (see FIG. 24). Both flanges 228 and 230 have a plurality of aligned holes 232 to accommodate fastening with bolts 234 and nuts 236. Height is adjusted by removing the bolts 234 and nuts 236, moving the flanges 228 and 230 relative to each other and re-assembling in the desired position (See FIG. 23).

The second form of height adjustment is shown in FIGS. 25 through 27. In this embodiment, the shank 238 is composed of a forward section 240 and an offset rearward section 242, and is detachable from the first pivot member 54. In this form of the invention, the first pivot member has a hollow square portion 244, where the shank 238 can be inserted and held in place by a bolt 246 and nut 248. Height adjustment is accomplished by selecting a shank bar with the desired offset between a forward centerline 250 and rearward centerline 252. The shank bar 238 can also be rotated about the longitudinal centerline 250 to shift the height in the opposite direction.

An alternate embodiment of the adjustable link assembly 11 is shown in FIGS. 28 through 33. In this embodiment, the adjustable link assembly 10 is replaced by a multiple pin bracket 172, and engaging clip 174 attached to one or both of the spring bars 26, 28. In addition, there is an engaging tool 13. When installed, the bracket 172 and clip 174 rigidly connect the tip 176 of the spring bar 26 to the frame of the trailer 184, thereby eliminating the rotation between the ball mount 18 and the trailer tongue 16.

The multiple pin bracket 172 consists of a flat section 180 with integral pins 178 arranged in a generally vertical alignment, and a stud 196. The bracket 172 is secured by bolts 182, or otherwise securely mounted to the frame 184 of the trailer. The engaging clip 174 consists of a slotted section 186, and a flanged section 188, a hitch pin 190, and bolts 192, which attach it to the spring bar 26. The engaging tool 13 consists of a handle 194, a pivot pin 196, a hollow base 198, a hook portion 200, and a chain section 204.

In use, the trailer is attached at the ball 20. The spring bar 26 is pivotally attached at its trunniun 206, and the front end of the trailer is raised via a tongue jack until the engaging clip is close enough to the pin bracket to facilitate engagement of the clip 174 to the bracket 172. The base 198 of the engaging tool 13 is placed over the stud 196 of the bracket 172, and the hook portion 200 is placed under the lower side of the spring bar 26. The handle portion 194 is then manually raised until the slotted portion 186 of the clip 174 can be moved over and lowered onto one of the pins 178 of the bracket 172. The hitch pin 190 is then inserted through a pin hole in the clip, thereby securing the clip 174 to the bracket 172.

The initial setup of the alternate bracket and clip embodiment is done by first hitching the trailer to the ball mount 18 and anti-sway shank 12, with the alignment tool 152 inserted. The trailer and tow vehicle are then driven straight forward until the trailer is tracking straight behind the tow vehicle. The spring bar is then pivotally attached at the trunniun 206. The multiple pin bracket 172 is temporarily clamped in position, and the clip is engaged over one of the pins 178 utilizing the engaging tool 13 as previously described. The weight distribution of the hitch can be then checked and adjusted as required by moving the clip to one of the other pins 178. Once the desired alignment of the trailer and weight distribution are achieved, the frame of the trailer can be drilled to facilitate bolting 182 the bracket 172 to the frame 184 of the trailer. The alignment tool 152 is then removed and the setup is complete.

CONCLUSION, RAMIFICATIONS AND SCOPE

This invention provides an effective method of controlling sway in a towed trailer. In addition, this invention is adaptable to standard equalizing hitch components. While the description above contains many details, these should not be construed as limiting the scope of the invention, but as a preferred embodiment of the invention. Accordingly, the scope of the invention should be determined by the claims, not the specifics of the preferred embodiment.

What I claim is:

1. An anti-sway device for coupling a tow vehicle to a trailer comprising;
    a) an elongate shank member for coupling to a trailer hitch receiver of a tow vehicle;
    b) a first pivot member attached to said shank member having two sets of coaxial first right and left pivot pins (122, 126 and 120, 124)
    c) two connecting links, one attaching pivotally at each end of said first pivot member upper and lower pivot pins;
    d) a second pivot member, coplanar to said first pivot member, having two sets of coaxial second right and left pivot pins (86, 88 and 90, 92) attached pivotally at each end to said connecting links where horizontal clearance exists between said right and left sets of pivot pins, and the horizontal distance between the pivot pins of said second pivot member is greater than the horizontal distance between the pivot pins of said first pivot member, providing for four linked pivotable joints, said four link pivotable joints providing for an effective pivot point substantially forward of said first pivot member when said tow vehicle and said trailer are oriented in a straight line, such that when said second pivot member is rotated about said first pivot member, one said set of pivot pins (120, 124 or 122, 126) of said first pivot member can pass in between the said sets of pivot pins (86, 88 and 90, 92) of said second pivot member, into said horizontal clearance of said second pivot member, without interference between said first and second pivot members and;
    e) mounting means on a second side of said second pivot member for a hitch ball, and a link; and
    f) link means for eliminating the rotation of the trailer tongue about a vertical axis relative to a hitch ball.

2. The anti-sway device of claim 1 wherein the first pivot member is H-shaped in an elevation view.

3. The anti-sway device of claim 1 wherein the second pivot member is V-shaped in a plan view.

4. An anti-sway device according to claim 1, wherein said connecting links and said first and second pivot members pivot on bearing means.

5. An anti-sway device according to claim 1, wherein said second pivot member is manually positionable in a horizontal plane prior to attachment of said trailer tongue and said link means.

6. An anti-sway device according to claim 1, wherein said second side of said second pivot member includes mounting means for a hitch ball, equalizing hitch spring bars, and a link.

7. An anti-sway device for coupling a tow vehicle to a trailer comprising;
    a) an elongate shank member for coupling to a trailer hitch receiver of a tow vehicle;
    b) a first pivot member attached to said shank member having two sets of coaxial first right and left pivot pins (122, 126 and 120, 124);
    c) two connecting links, one attaching pivotally at each end of said first pivot member upper and lower pivot pins;
    d) a second pivot member, coplanar to said first pivot member, having two sets of coaxial second right and left pivot pins (86, 88 and 90, 92) attached pivotally at each end to said connecting links where horizontal clearance exists between said right and left sets of pivot pins, and the horizontal distance between the pivot pins of said second pivot member is greater than the horizontal distance between the pivot pins of said first pivot member, providing for four linked pivotable joints, said four link pivotable joints providing for an effective pivot point substantially forward of said first pivot member when said tow vehicle and said trailer are oriented in a straight line, such that when said second pivot member is rotated about said first pivot member, one said set of pivot pins (120, 124 or 122, 126) of said first pivot member can pass in between the said sets of pivot pins (86, 88 and 90, 92) of said second pivot member, into said horizontal clearance of said second pivot member, without interference between said first and second pivot members and;
    e) flange means on a second side of said second pivot member for multiple position attaching a conventional ball mount component of an equalizing trailer hitch; and
    f) link means for eliminating the rotation of the trailer tongue about a vertical axis relative to said ball mount.

8. An anti-sway device according to claim 7, wherein said shank member attached to said first and second pivot members and said connecting links, when uncoupled from said hitch receiver and ball mount, is invertible thus furthering the height adjustment of said ball mount when reassembled.

9. An anti-sway device according to claim 7, wherein said link means is comprised of at least one equalizing hitch spring bar rigidly attached to a trailer frame, thereby eliminating rotation between the trailer and said ball mount.

10. An anti-sway device according to claim 7, wherein said elongate shank member is comprised of a forward section and a parallel vertically offset rearward section attached to said first pivot member by fastening means wherein the shank member may be replaced with a shank member with greater or lesser offset, thereby allowing height adjustment.

* * * * *